United States Patent
Chastain et al.

(10) Patent No.: US 10,399,861 B2
(45) Date of Patent: Sep. 3, 2019

(54) METHODS FOR THE PRODUCTION OF POTASSIUM SULPHATE FROM POTASSIUM-CONTAINING ORES AT HIGH AMBIENT TEMPERATURES

(71) Applicant: Yara Dallol BV, HJ Sluiskil (NL)

(72) Inventors: Richard W. Chastain, Montreal (CA); Ingrid T. Buckhurst, Porsgrunn (NO); Antoine Lefaivre, Montreal (CA); Thomas H. Neuman, Montreal (CA)

(73) Assignee: YARA DALLOL BV, Sluiskil (NL)

( * ) Notice: Subject to any disclaimer, the term of this patent is extended or adjusted under 35 U.S.C. 154(b) by 0 days.

(21) Appl. No.: 15/569,207

(22) PCT Filed: May 4, 2016

(86) PCT No.: PCT/EP2016/059952
§ 371 (c)(1),
(2) Date: Oct. 25, 2017

(87) PCT Pub. No.: WO2016/180692
PCT Pub. Date: Nov. 17, 2016

(65) Prior Publication Data
US 2018/0111839 A1  Apr. 26, 2018

(30) Foreign Application Priority Data
May 8, 2015 (NO) .................................. 20150571

(51) Int. Cl.
*C01D 5/00* (2006.01)
*C01D 5/10* (2006.01)
(Continued)

(52) U.S. Cl.
CPC .................. *C01D 5/10* (2013.01); *C01D 5/16* (2013.01); *C01F 5/40* (2013.01)

(58) Field of Classification Search
CPC ... C01D 5/00; C01D 5/10; C01D 5/12; C01D 5/16
(Continued)

(56) References Cited

U.S. PATENT DOCUMENTS 2,895,794 A  7/1959  Dancy et al.
2,902,344 A  9/1959  Cevidalli et al.
(Continued)

FOREIGN PATENT DOCUMENTS

FR  1 310 823   11/1962
FR  2 013 750   4/1970

OTHER PUBLICATIONS

Translation of FR 1310823. (Year: 1962).*
(Continued)

*Primary Examiner* — Steven J Bos
(74) *Attorney, Agent, or Firm* — Wenderoth, Lind & Ponack, L.L.P.

(57) ABSTRACT

A method for the production of potassium sulphate comprising contacting an aqueous potassium- and sulphate-containing composition with magnesium chloride ($MgCl_2$), thereby obtaining a composition comprising kainite; optionally concentrating the kainite from the composition; reacting the kainite with magnesium sulphate ($MgSO_4$) and potassium sulphate ($K_2SO_4$) so as to convert the kainite into leonite ($K_2SO_4 \cdot MgSO_4 \cdot 4H_2O$); optionally contacting the leonite with water to remove excess $MgSO_4$; and contacting the leonite with water so as to leach the $MgSO_4$, contained in the leonite, and to at least substantially selectively precipitate potassium sulphate ($K_2SO_4$). The method can be operated at higher temperatures, in particular, at temperatures above 35° C., and does not require a cooling step at 20 to 25° C. The method produces potassium sulphate with a low amount of chloride.

19 Claims, 1 Drawing Sheet

(51) Int. Cl.
*C01D 5/16* (2006.01)
*C01F 5/40* (2006.01)

(58) Field of Classification Search
USPC .................................................. 423/199, 552
See application file for complete search history.

(56) References Cited

U.S. PATENT DOCUMENTS

| | | | | |
|---|---|---|---|---|
| 3,058,806 A | * | 10/1962 | Ebner | C01D 5/10 423/197 |
| 3,198,601 A | | 8/1965 | Veronica et al. | |
| 3,243,259 A | * | 3/1966 | Stein | C01D 5/10 423/197 |
| 3,415,620 A | * | 12/1968 | Scarfi | C01D 5/10 423/197 |
| 3,451,770 A | * | 6/1969 | Scarfi | C01D 3/08 423/208 |
| 3,589,871 A | | 6/1971 | Neitzel | |
| 3,634,041 A | | 1/1972 | Ryan et al. | |
| 2005/0220698 A1 | | 10/2005 | Ghosh et al. | |

OTHER PUBLICATIONS

International Search Report and Written Opinion of the International Searching Authority dated Jul. 6, 2016 in International (PCT) Application No. PCT/EP2016/059952.

Search Report dated Dec. 16, 2015 in corresponding Norwegian Application No. 20150571.

Dave et al., "Efficient Recovery of Potassium Chloride from Liquid Effluent Generated during Preparation of Schoenite from Kainite Mixed Salt and Its Reuse in production of Potassium Sulfate", Ind. Eng. Chem. Res., vol. 45, 2006, pp. 1551-1556.

International Preliminary Report on Patentability dated Jun. 27, 2017 in International (PCT) Application No. PCT/EP2016/059952.

* cited by examiner

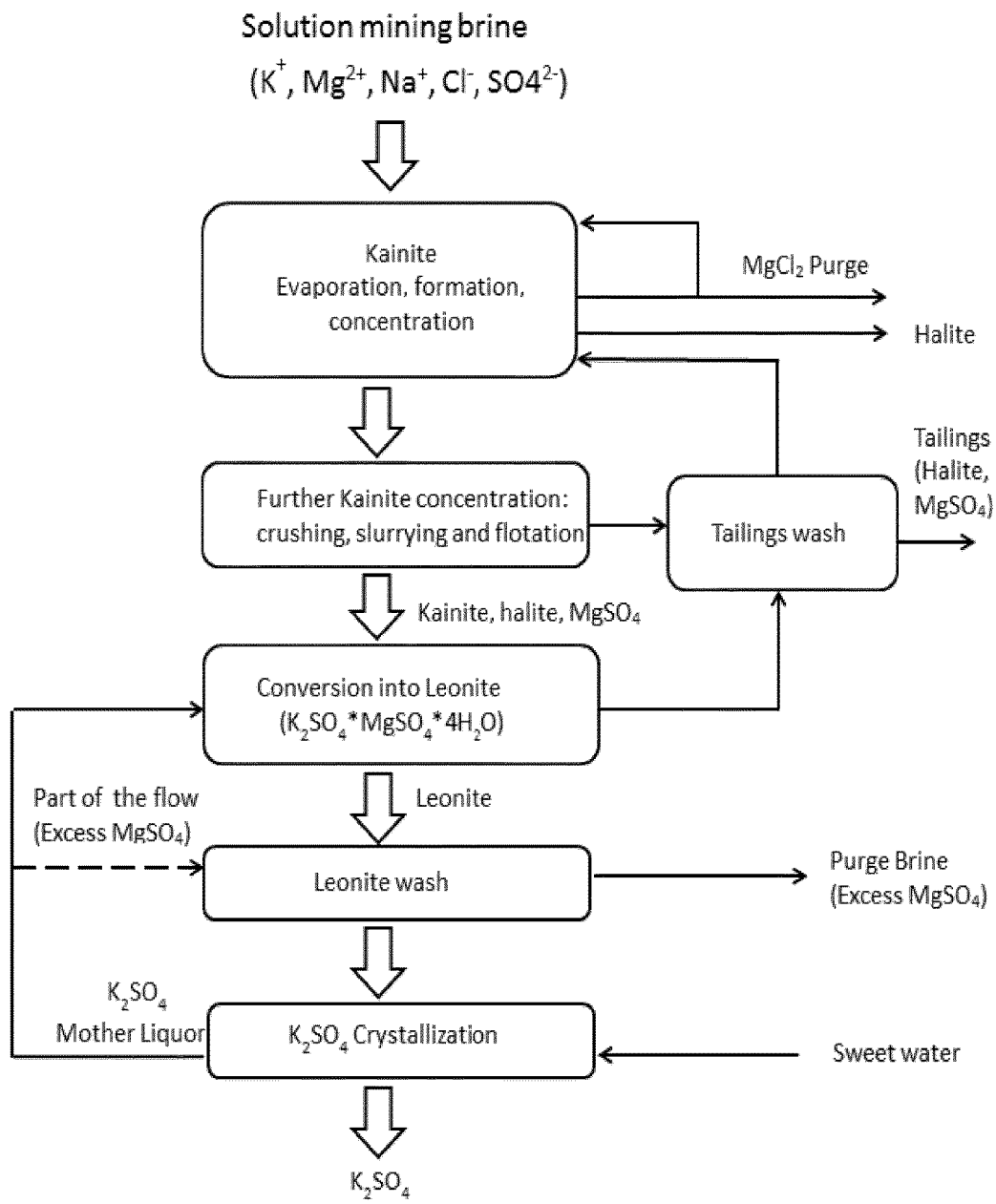

METHODS FOR THE PRODUCTION OF POTASSIUM SULPHATE FROM POTASSIUM-CONTAINING ORES AT HIGH AMBIENT TEMPERATURES

TECHNICAL FIELD

The present disclosure relates to improvements in the field of methods for preparing potassium sulphate from potassium-containing ores.

BACKGROUND OF THE DISCLOSURE

Potassium is the third major plant and crop nutrient after nitrogen and phosphorus. It has been used since antiquity as a soil fertilizer (about 90% of its current use). It is mined throughout the world from potassium deposits, either in underground or surface mines, wherein potassium is found in different chemical forms, such as carbonate, chloride, sulphate and nitrate. Each of these chemical forms requires a different chemical procedure to extract and concentrate the potassium from the deposits.

Since potassium sulphate ($K_2SO_4$) does not contain chloride, it is the preferred choice for crops, which are sensible to chloride, and which include coffee and several fruits and vegetables. Also crops that are less sensitive to chloride may still require potassium sulphate for optimal growth if the soil accumulates chloride from irrigation water.

Various methods have been proposed so far regarding the production of potassium sulphate (also called "sulphate of potash" or SOP) and various routes have been explored. For example, solution mining of sylvinite (a mixture of KCl and NaCl) for the production of KCl is known and is a technology that is practiced, a.o. in cold climate areas, for example, in Saskatchewan, Canada.

U.S. Pat. No. 2,902,344 (SINCAT SPA, 1959) discloses a process for the recovery of potassium sulphate from kainite ore ($KCl.MgSO_4.H_2O$) containing sodium chloride as an impurity. The kainite ore is converted into schoenite by mixing with the mother liquor containing some potassium sulphate at 20° C., and further decomposed into SOP using warm water, preferably at about 45° C.

DE 1592035 A1 (SINCAT SPA, 1970) discloses a process for the recovery of potassium sulphate from kainite ore using a langbeinite ($K_2Mg_2(SO_4)_3$) suspension which is processed into schoenite ($K_2SO_4.MgSO_4.6H_2O$) and leonite ($K_2SO_4.MgSO_4.4H_2O$) at 20 to 35° C.

U.S. Pat. No. 3,058,806 (Metallgesellschaft, 1962) discloses a process for the production of SOP from kainite by the dissolution of kainite in hot water, which comprises a cooling step to form the schoenite crystals and reacting it with potassium chloride.

U.S. Pat. No. 3,589,871 (GREAT SALT LAKE MINERALS, 1971) discloses a method of producing kainite from natural brines containing potassium by adding $MgCl_2$ and using evaporation in solar ponds to precipitate kainite and carnallite ($KMgCl_3.6(H_2O)$).

U.S. Pat. No. 3,634,041 (GREAT SALT LAKE MINERALS, 1972) discloses a process for the production of SOP from essentially pure schoenite.

WO 05/063626 A1 (Indian Council of Scientific Industrial Research, 2005) discloses a process for the production of SOP from bittern comprising a step wherein kainite is converted into schoenite, aqueous $CaCl_2$ is used and crude carnallite is produced as an intermediate using a cooling step at ambient temperature (25° C.).

None of the known processes is able to operate entirely at temperatures above 35° C., using a minimum of water as well as electrical power, and can be operated with different potassium deposits or a mixture thereof.

The current invention discloses a method which could be operated at higher temperatures, in particular at temperatures above 35° C. and which does not require a process step operated at a temperature below 35° C., in particular a cooling step at 20 to 25° C. Although the use of the method according to the invention is not limited to said temperatures, the method according to the invention can be advantageously used in mining areas which are situated in warm or hot climates (such as the Dallol region in Ethiopia). Furthermore, the method of the invention is very energy-efficient as it does not use mechanical cooling, nor heating devices, and it uses low amounts of freshwater. Therefore, the method according to the invention is especially suitable for use in remote location where access to energy and auxiliary systems is difficult. Furthermore, the method according to the invention may start from a solution, obtained by solution mining such that different potassium salts and mixtures thereof can be processed. It is a further object of the process to minimize water usage, as well as to minimize power usage and cooling water. The process can be operated economically in a hot, dry area that has limited resources available.

The method according to the invention is based on the finding that schoenite does not form at temperatures above 35° C., more in particular above 40° C. and under the conditions of the described method, such that a method for the production of potassium sulphate was developed, based on the formation of leonite.

SUMMARY OF THE INVENTION

According to one aspect of the invention, there is provided a method for the production of potassium sulphate, comprising the consecutive steps of:

Ia) contacting an aqueous potassium- and sulphate-containing composition with magnesium chloride ($MgCl_2$), thereby obtaining a composition comprising kainite ($KCl.MgSO_4.2.75H_2O$);

IIa) optionally, concentrating the kainite from the composition, obtained in step Ia;

IIIa) reacting the kainite, obtained in step Ia or IIa, with magnesium sulphate ($MgSO_4$) and potassium sulphate ($K_2SO_4$) so as to convert the kainite into leonite ($K_2SO_4.MgSO_4.4H_2O$);

IVa) optionally, contacting the leonite, obtained in step IIIa, with water to remove excess $MgSO_4$; and Va) contacting the leonite, obtained in step IIIa or IVa, with water so as to dissolve leonite and/or leach the $MgSO_4$, contained in the leonite, and to at least substantially selectively crystallize potassium sulphate ($K_2SO_4$).

According to another aspect of the invention, there is provided a method for the production of potassium sulphate, comprising the consecutive steps of:

Ib) contacting an aqueous potassium-containing composition, further comprising sodium chloride, with magnesium chloride ($MgCl_2$), thereby obtaining a composition comprising kainite ($KCl.MgSO_4.2.75H_2O$);

IIb) optionally, concentrating the kainite from the composition, obtained in step Ib and controlling the concentration of sodium chloride, present in the composition comprising kainite so as to maintain the concentration of sodium chloride below about 10% by weight on dry matter basis;

IIIb) reacting the kainite, obtained in step Ib or IIb with magnesium sulphate (MgSO$_4$) and potassium sulphate (K$_2$SO$_4$) at a temperature of about 35° C. to about 65° C. so as to convert the kainite into leonite (K$_2$SO$_4$.MgSO$_4$.4H$_2$O) and optionally at least minimizing formation of bloedite (Na$_2$Mg(SO$_4$).4H$_2$O) and/or schoenite (K$_2$SO$_4$.MgSO$_4$.6H$_2$O);

IVb) optionally, contacting the leonite, obtained in step IIIb, with water to remove excess MgSO$_4$; and Vb) contacting the leonite, obtained in step IIIb or IVb, with water so as to leach the MgSO$_4$, contained in the leonite, and to at least substantially selectively precipitate potassium sulphate (K$_2$SO$_4$).

Further features and advantages will become more readily apparent from the following description of various embodiments as illustrated by way of examples only and in a non-limitative manner.

DETAILED DESCRIPTION OF THE INVENTION

The expression "by at least minimizing formation of bloedite" as used herein refers to a process in which the obtained product contains bloedite at a concentration of less than about 10% by weight.

The expression "at least substantially selectively crystallize potassium sulphate (K$_2$SO$_4$)" as used herein, refers to a process in which the precipitate comprises at least 85% by weight of potassium sulphate.

The expression "consecutive step" means that the steps, as cited, are to be executed the one after the other in the numerical order (I, II, III, IV and V), optionally intermitted by other steps.

The expression "potassium- and sulphate-containing composition" means that the composition comprises potassium ions and sulphate ions, not necessarily from the same source, such as the same deposit, but also from different deposits and different potassium- and sulphate-containing ores.

Where weight % are cited, unless otherwise specified, such weight % are based on the weight of dry matter.

Step I

According to one aspect of the invention, there is provided a method for the production of potassium sulphate, comprising at least the step of contacting an aqueous potassium- and sulphate-containing composition with magnesium chloride (MgCl$_2$), thereby obtaining a composition comprising kainite(KCl.MgSO$_4$.2.75H$_2$O); the aqueous potassium- and sulphate-containing composition may additionally comprise an amount of sodium chloride (Step Ib).

According to one aspect of the invention, in the methods of the present disclosure, the aqueous potassium- and sulphate-containing composition can be a brine comprising chlorides and sulphates of potassium, magnesium and sodium.

According to one aspect of the invention, the aqueous potassium and sulphate-containing composition can be a solution mining brine. This offers the advantage that different types of potassium- and sulphate-containing ores can be processed into SOP by the same method according to the invention.

According to one aspect of the invention, the method according to the invention may comprise contacting one or more potassium- and sulphate-containing ores with water so as to obtain the aqueous potassium and sulphate-containing composition, in particular the solution mining brine.

For example, the aqueous potassium- and sulphate-containing composition may comprise about 1 to about 500 g/l of K ion, about 5 to about 200 g/l of K ion, about 20 to about 150 g/l of K ion, about 5 to about 100 g/l of K ion, about 5 to about 50 g/l of K ion, about 20 to about 200 g/l of K ion, about 50 to about 150 g/l of K ion, about 100 to about 200 g/l of K ion, or about 150 to about 200 g/l of K ion.

For example, the aqueous potassium- and sulphate-containing composition may comprise about 1 to about 500 g/l of SO$_4^{2-}$ ion, about 5 to about 100 g/l of SO$_4^{2-}$ ion, about 10 to about 100 g/l of SO$_4^{2-}$ ion, about 5 to about 150 g/l of SO$_4^{2-}$ ion, about 5 to about 50 g/l of SO$_4^{2-}$ ion, about 20 to about 80 g/l of SO$_4^{2-}$ ion, about 10 to about 50 g/l of SO$_4^{2-}$ ion, about 40 to about 70 g/l of SO$_4^{2-}$ ion, or about 40 to about 60 g/l of SO$_4^{2-}$ ion.

For example, the aqueous potassium- and sulphate-containing composition may comprise about 1 to about 500 g/l of Mg$^{2+}$ ion, about 5 to about 250 g/l of Mg$^{2+}$ ion, about 5 to about 150 g/l of Mg$^{2+}$ ion, about 5 to about 100 g/l of Mg$^{2+}$ ion, about 5 to about 50 g/l of Mg$^{2+}$ ion, about 25 to about 100 g/l of Mg$^{2+}$ ion, about 50 to about 100 g/l of Mg$^{2+}$ ion, about 40 to about 120 g/l of Mg$^{2+}$ ion, or about 70 to about 100 g/l of Mg$^{2+}$ ion.

Step I may be accompanied by a step of solidifying (precipitating or crystallization) of the kainite. Step I can be carried out using solar evaporation ponds, preferably in locations where ambient temperatures can exceed 35° C. Some methods disclosed in the prior art (see e.g. U.S. Pat. No. 3,589,871) involve the production of salts using solar pond evaporation but are based, at some point, on the conversion of said salts (hereafter called solar salts) to produce schoenite, with subsequent conversion to K$_2$SO$_4$. The use of solar ponds allows the evaporation of water, the formation of kainite and the concentration of kainite, such that kainite in solid form may be obtained.

Step II

According to one aspect of the invention, there is provided a method for the production of potassium sulphate, optionally comprising at least the step of concentrating the solid kainite from the composition, obtained in step Ia or Ib (step IIa or IIb).

The concentration step may be necessary for removing impurities such as halite, preferably by flotation, from the kainite.

According to the method of the invention, the feed salt to the conversion (step IIIa) should have a very low halite content and a high kainite content, compared to prior art processes. According to one embodiment, this is preferably achieved by the use evaporation ponds and by the use of pond control. Halite may inhibit the formation of leonite in favour of bloedite (Na$_2$Mg(SO$_4$).4H$_2$O) or in favour of a solid solution of leonite and bloedite (mixed crystal form), and may decrease the efficiency of the SOP-crystallization (step V).

According to one aspect, the method further comprises controlling the concentration of the sodium chloride, present in the composition comprising kainite, so as to maintain the concentration of sodium chloride below about 10% by weight, preferably below about 5% by weight, more preferably below about 2.5% by weight, most preferably below 1% by weight on dry matter basis.

According to one aspect, controlling the concentration of sodium chloride, present in the composition comprising kainite, can be carried out by means of a flotation technique.

According to one aspect, the controlling of the concentration of sodium chloride present in the composition comprising kainite can be effective for obtaining a concentration of kainite of above 50% by weight, preferable above 60% by weight, more preferably above 70% by weight, and most preferably above 80% by weight, based on dry matter basis.

According to one embodiment, step II is omitted and a solution brine is made directly from mining by combining step I and III, comprising leonite.

Step III

According to one aspect of the invention, there is provided a method for the production of potassium sulphate, comprising at least the step of reacting the kainite, obtained in step Ia or IIa; or Ib or IIb, with magnesium sulphate ($MgSO_4$) and potassium sulphate ($K_2SO_4$) so as to convert the kainite into leonite ($K_2SO_4.MgSO_4.4H_2O$), preferably at a temperature of about 35° C. to about 65° C. so as to convert the kainite into leonite ($K_2SO_4.MgSO_4.4H_2O$) and optionally at least minimizing formation of bloedite ($Na_2Mg(SO_4).4H_2O$) and/or schoenite ($K_2SO_4.MgSO_4.6H_2O$).

According to one aspect, contacting the aqueous potassium-containing composition with magnesium chloride can be carried out by contacting the aqueous potassium-containing composition with an aqueous composition comprising the magnesium chloride.

According to one aspect, the aqueous composition comprising magnesium chloride can comprise about 1 to about 500 g/l of $Mg^{2+}$ ion, about 5 to about 300 g/l of $Mg^{2+}$ ion, about 5 to about 250 g/l of $Mg^{2+}$ ion, about 5 to about 100 g/l of $Mg^{2+}$ ion, about 15 to about 250 g/l of $Mg^{2+}$ ion, about 25 to about 200 g/l of $Mg^{2+}$ ion, about 50 to about 250 g/l of $Mg^{2+}$ ion, about 40 to about 200 g/l of $Mg^{2+}$ ion, or about 100 to about 200 g/l of $Mg^{2+}$ ion.

According to one aspect, the composition comprising kainite can be reacted with a solution comprising magnesium sulphate and potassium sulphate, at a temperature of about 35° C. or above, in particular of about 35° C. to about 55° C., more in particular of about 45° C. to about 55° C.

The reaction of step IIIa or IIIb is an exothermic process and operates at a temperature of 50-55° C. without a cooling step.

According to one aspect, leonite can be present in the composition comprising leonite at a concentration of at least 90% by weight, at least 95% by weight, or at least 99% by weight.

According to one aspect, the method can be carried out by at least substantially avoiding formation of bloedite.

According to one aspect, the obtained leonite comprises less than about 5% by weight of bloedite, less than about 4% by weight of bloedite, less than about 3% by weight of bloedite, less than about 2% by weight of bloedite, less than about 1% by weight of bloedite, or less than about 0.5% by weight of bloedite.

According to one aspect, the method can be carried out by at least substantially avoiding formation of schoenite.

According to one aspect, the obtained leonite comprises less than about 5% by weight of schoenite, less than about 4% by weight of schoenite, less than about 3% by weight of schoenite, less than about 2% by weight of schoenite, less than about 1% by weight of schoenite, or less than about 0.5% by weight of schoenite.

Step IV

According to one aspect of the invention, there is provided a method for the production of potassium sulphate, optionally comprising at least the step of contacting the leonite, obtained in step IIIa or 111b, with water to remove excess $MgSO_4$(leonite wash).

It was found that the crystallization of potassium sulphate was improved when excess $MgSO_4$ was removed.

According to one aspect, removing remaining magnesium sulphate can be done by contacting the salt mixture comprising leonite and magnesium sulphate hydrate with an aqueous solution comprising magnesium sulphate and potassium sulphate, at a temperature of about 35° C. or above, in particular of about 40° C. to about 65° C., more in particular of about 45° C. to about 55° C.

According to one aspect, removing remaining magnesium sulphate can be done by contacting the salt mixture comprising leonite and magnesium sulphate hydrate with the mother liquor from the SOP crystallization (Step V).

According to one aspect, leonite can be present in the composition comprising leonite at a concentration of at least 90% by weight, at least 95% by weight, or at least 99% by weight.

According to one aspect, the method can be carried out by at least substantially avoiding formation of bloedite.

According to one aspect, the obtained leonite comprises less than about 5% by weight of bloedite, less than about 4% by weight of bloedite, less than about 3% by weight of bloedite, less than about 2% by weight of bloedite, less than about 1% by weight of bloedite, or less than about 0.5% by weight of bloedite.

According to one aspect, the method can be carried out by at least substantially avoiding formation of schoenite.

According to one aspect, the obtained leonite comprises less than about 5% by weight of schoenite, less than about 4% by weight of schoenite, less than about 3% by weight of schoenite, less than about 2% by weight of schoenite, less than about 1% by weight of schoenite, or less than about 0.5% by weight of schoenite.

Step V

According to one aspect of the invention, there is provided a method for the production of potassium sulphate, comprising at least the step of contacting the leonite, obtained in step IV, with water so as to leach the $MgSO_4$ contained in the leonite and to at least substantially selectively solidify (i.e. precipitation or crystallization) potassium sulphate ($K_2SO_4$).

According to one aspect, the obtained potassium sulphate obtained can contain less than 10% by weight of impurities, less than 5% by weight of impurities, less than 3% by weight of impurities, less than 2% by weight of impurities, less than 1% by weight of impurities, or less than 0.5% by weight of impurities.

The process of step V is an endothermic process. Therefore, the water needs to be provided at an elevated temperature, i.e. at a temperature of between 50° C. and 65° C. Such temperature can be provided with the use of solar heating, i.e; electrically using solar cells or by using tubes heated directly by the sun.

For example, contacting the leonite with water so as to leach the $MgSO_4$ contained in the leonite and to at least substantially selectively precipitate/crystallize the potassium sulfate ($K_2SO_4$) can be effective for providing potassium sulfate that is crystallized and the method further comprises separating the crystallized potassium sulfate from a brine (mother liquor) by means of a solid-liquid separation, wherein the brine may comprise potassium sulphate and magnesium sulphate.

According to one aspect, the method can further comprise recycling said brine and using said brine for reacting with kainite, obtained in step IIa or IIb with the brine that comprises magnesium sulphate and potassium sulphate so as to convert the kainite into leonite, as disclosed in step IIIa or IIIb.

According to one aspect, the precipitation/crystallization of the potassium sulphate can be carried out at a temperature of about 45° C. to about 60° C., of about 48° C. to about 55° C., or of about 49° C. to about 53° C.

DETAILED DESCRIPTION OF THE DRAWINGS

In the following drawings, which represent by way of example only, various embodiments of the disclosure:

FIG. 1 shows a block diagram of an example of a process according to the present invention According to one aspect of the invention, the brines (or salt compositions) that can be used in the methods of the present disclosure can be either naturally occurring, as in lakes, springs, or subsurface brine deposits, or produced by actively solution-mining deeper, more consolidated deposits. The brine can be concentrated in solar evaporation ponds by evaporation and the composition of the brine, as it progresses through a series of ponds, can be controlled by the use of recycled brine from subsequent steps in the process so as to produce salts comprising kainite, halite (NaCl), possibly carnallite ($KMgCl_3.6(H_2O)$) and hydrated magnesium sulphate salts, other than leonite or schoenite, such as $MgSO_4.6H_2O$ in the solar ponds. For example, by management of the solar ponds, the salts eventually harvested can be limited to halite, magnesium sulphate and kainite, for example, by the use of recycle brine.

Solar salts from the harvest ponds comprising kainite and halite can have a kainite concentration above about 50% by weight, or above about 59% by weight. For example, the salts can be sized to smaller than 400 microns by, for example, crushing and slurrying. For example, the concentration of kainite can be increased by means of flotation and/or leaching with suitable brine, where the species to be rejected are halite and hydrated magnesium sulphate salts, such that concentrated salts are obtained.

The concentrated salts can have a kainite concentration of above 65% or 70% by weight, and they can then be reacted (conversion) at a temperature above about 35° C., or of about 35° C. to about 65° C., with recycled brine from subsequent steps in the process (also called mother liquor) to convert the kainite into leonite. The use of this recycled brine (mother liquor), which can contain a significant concentration of potassium sulphate, results in more leonite being produced than the potassium ion in the kainite feed alone would permit. For example, depending on the temperature of the conversion, other $MgSO_4$ contaminants may be precipitated, as well as leonite, and the leonite resulting from this reaction, if necessary to achieve a purity which is suitable for a feed to a potassium sulphate crystallization circuit, may be leached with suitable brine (leonite wash) and subjected to known solid-liquid separation techniques. At temperatures above about 35° C. or above about 45° C., the formation of schoenite was not observed.

The magnesium sulphate, contained in the leonite, can then be subjected to selective leaching with water ((for example water added (or added to water) and crystallization), for example, in a vessel or vessels designed to promote crystal growth, whereby substantially all of the magnesium sulphate and a portion of the potassium sulphate contained in the leonite are taken into solution (or leached), with the remaining portion of the potassium sulphate produced as crystalline material. This crystallization can be conducted at a temperature of about 45° C. to about 60° C. For example, and without wishing to be bound by such a theory, leonite can be dissolved substantially at the same time the $K_2SO_4$ crystallization occurs.

For example, clear brine from this step can be used in earlier steps of the process where additional leonite may be precipitated. For example, it can be used for reacting magnesium sulphate in the kainite conversion reaction step into leonite. The clear brine can have a magnesium to potassium weight ratio of about 0.4 to about 0.7 or of about 0.5 to about 0.6. Potassium sulphate, remaining in brine streams, eventually recycled to the solar evaporation ponds, can again be captured as solid kainite and recovered. The potassium sulphate solids can be withdrawn from the crystallization equipment and may or may not be leached with additional water before being subjected to known solid-liquid separation techniques, where they may or may not be washed with water.

The high purity potassium sulphate solids can then be dried, sized and either granulated to meet market specifications or sold as produced.

Brines containing ions of K, Mg, Na, Cl and $SO_4$— can be concentrated by solar evaporation and by the use of recycle brines caused to precipitate salts comprising kainite, halite, carnallite and one or more hydrated magnesium sulphate salt.

The methods of the present disclosure can be directed to the production of high purity potassium sulphate, encompassing a maximized recovery of potassium sulphate in the crystallization step, by a process including conversion of kainite to high purity leonite in a system operating at high ambient temperature (for example temperatures above about 35° C.; temperatures of about 35° C. to about 65° C.; or about 35° C. to about 55° C.). At temperatures above about 35° C., formation of schoenite was not observed.

When tests were conducted to confirm conversion of kainite, containing appreciable amounts of halite and hydrated magnesium sulphate, to leonite in reaction with brine from the potassium sulphate crystallization step at a temperature above about 35° C., the resulting leonite was contaminated with what at first appeared to be an unacceptable level of bloedite ($Na_2Mg(SO_4).4H_2O$) not removable by washing. It was subsequently discovered that this is related to a high concentration of sodium ions in solution which results in bloedite forming, not as a separate discrete species, but as crystal lattice replacement within the leonite crystals (a solid solution of the two species). Without wishing to be bound by such a theory, this is likely the result of the similarity between leonite and bloedite crystal structure; they are analogs in that both are four water hydrates of a magnesium sulphate double salt, with very little difference in size between the potassium and sodium ions (1.33 and 0.96 Angstrom respectively). The inventors found that contamination of leonite with bloedite by this mechanism may be controlled by maintaining the concentration of sodium ion in the conversion reaction brine low, say, for example, below about 10% by weight, below about 8% by weight, or below about 6% by weight, and controlling the degree of super saturation created in the reaction vessels.

Without wishing to be bound by such a theory, it is believed that this crystal lattice replacement phenomenon is analogous to the contamination of sodium carbonate decahydrate crystal by crystal lattice inclusions of sodium sulphate decahydrate, experienced by the inventors in previous work. For the sodium carbonate—sodium sulphate—water system, the degree of contamination is directly proportional to the concentration of sulphate ion in the mother liquor. There was also an apparent correlation observed with the degree of super saturation created in the crystallizer—higher super saturation level and more rapid crystal formation accompanied by more sulphate in the crystal lattice—although this was difficult to prove beyond question, as was an apparent correlation with temperature.

The presence of magnesium sulphate, not associated with the potassium sulphate ion, requires higher water to potassium sulphate ratio to dissolve all the magnesium sulphate contained in the leonite feed to the potassium sulphate crystallizer; this results in a higher percentage of the potassium sulphate contained in the leonite being taken into solution. Put in another way, the result is lower recovery of potassium as solid potassium sulphate and higher recycle brine flow because more water is used per unit of potassium sulphate produced, and larger evaporation ponds and plant are required for any given production capacity.

EXAMPLES

The following example illustrates the method according to the invention. Optimization was not performed but the gist of the invention is shown hereunder. All process steps are performed in the laboratory on a laboratory scale.

Step I was not performed. The salt mixture used in the laboratory testing was made in the laboratory. The kainite salt was produced from a laboratory brine, made from commercially available halite and magnesium sulphates.

All testing was done in a bench scale range of 1-8 kg. However, the figures in the tables below are adjusted to reflect a starting solid of 100 kg to Step II (kainite concentration).

Step II: Concentrating Kainite and Removal of Halite

A salt mixture of 57 weight % kainite, 18 weight % halite, 22 weight % magnesium sulphate and 6 weight % bishofite ($MgCl_2.6H_2O$) was slurried in a flotation brine (composition: NaCl, KCl, $MgCl_2$, $MgSO_4.7H_2O$ and water). A frother aid and a flotation aid was added and the frothy supernatant was collected, filtered to remove remaining brine and kept for further processing in Step III. The salt mixture was ground to a P80 of about 350 microns). Flotation was carried out at 45° C. Recovery of K was 90%.

|   | Salt in (from Step II) 100 kg | Flotation Brine (slurry fraction) 370 kg | Flotation concentrate (top fraction) 64 kg |
| --- | --- | --- | --- |
| K | 9.0% | 1.0% | 13% |
| Mg | 8.6% | 6.6% | 10% |
| S | 10.5% | 2.5% | 12% |
| Cl | 21.3% | 17.6% | 18% |
| Na | 6.8% | 1.8% | 2% |

All % based on weight.

Step III: Conversion of Kainite into Leonite

The process was performed in semi continuous mode to prevent problems with super-saturation and sudden precipitation. The solids from step II and SOP-mother liquor brine from step V (synthetically made) was added in increments to a starting brine having the composition for an continuous process. The process was maintained at 45° C. and the retention time was 1 hour. The slurry was filtered and the solids were kept for further processing in Step IV. Leonite was added to seed the precipitation.

|   | Salt in 64 kg | SOP-Mother liquor brine 170 kg | Starting Brine 177 kg | Starting Leonite 62 kg | Leonite solids 180 kg |
| --- | --- | --- | --- | --- | --- |
| K | 13% | 5.7% | 1.9% | 19.7% | 18.7% |
| Mg | 10% | 3.5% | 5.5% | 6.9% | 7.5% |
| S | 12% | 6.9% | 4.5% | 17.2% | 16.7% |
| Cl | 18% | 0.1% | 10.4% | 0% | 2.9% |
| Na | 2% | 0.05% | 1.8% | 0.03% | 0.8% |

All % based on weight.

Step IV: Washing of Leonite

The solids from step III were reslurried in leach brine to dilute entrained brine from the conversion reactor for 60 min (leach brine=SOP-mother liquor almost saturated with $MgSO_4$, similar to purge brine). It was then filtered and washed with brine from SOP crystallizer (SOP-mother liquor). The filtered solids were kept for further processing in Step V.

|   | Salt in | Leach brine | SOP mother liquor brine | Leonite solids |
| --- | --- | --- | --- | --- |
|   | 180 kg | 440 kg | 127 kg | 163 kg |
| K | 18.7% | 2.8% | 5.7% | 20.2% |
| Mg | 7.5% | 5.3% | 3.5% | 6.9% |
| S | 16.7% | 8.3% | 6.9% | 18.4% |
| Cl | 2.9% | 0.1% | 0.1% | 0.1% |
| Na | 0.8% | 0.05% | 0.05% | 0.3% |

All % based on weight.

Step V: SOP Crystallization

This process was performed in a semi-continuous mode. The crystallizer was loaded with a starting brine made from 0.49 weight % of the water and 59 weight % of the solid (leonite). The remaining salts and water were added in increments, while clear liquid was removed to keep the amount constant. The procedure lasted approximately 6 hours. The slurry was then centrifuged and dried. The potassium sulphate produced had a $K_2O$ content over 50%, and a Cl content below 1%, which reflects the standard grade of chlorine free potassium sulphate.

|   | Leonite solids (total) 147 kg | Water (total) 181 kg | SOP solids 24 kg | Filtrate (SOP ML) 304 kg |
| --- | --- | --- | --- | --- |
| K | 20.8% |   | 41.9% | 6.0% |
| Mg | 7.0% |   | 0.4% | 3.3% |
| S | 18.7% |   | 17.5% | 7.0% |
| Cl | — |   | — | 0% |
| Na | 0.2% |   | 0.1% | 0% |

All % based on weight.

Overall recovery is about 48% for this laboratory scale experiment. Although the recovery is somewhat low, the method can be optimized to achieve recoveries of 60% and more.

While a description was made with particular reference to the specific embodiments, it will be understood that numerous modifications thereto will appear to those skilled in the art. The scope of the claims should not be limited by specific embodiments and examples provided in the present disclosure and accompanying drawings, but should be given the broadest interpretation consistent with the disclosure as a whole.

The invention claimed is:

1. A method for the production of potassium sulphate comprising the consecutive steps of:
   Ia) contacting an aqueous potassium- and sulphate-containing composition with magnesium chloride ($MgCl_2$), thereby obtaining a composition comprising kainite ($KCl.MgSO_4.2.75H_2O$);
   IIa) optionally, concentrating the kainite from the composition, obtained in step Ia;
   IIIa) reacting the kainite, obtained in step Ia or IIa, with magnesium sulphate ($MgSO_4$) and potassium sulphate ($K_2SO_4$) at a temperature of 45° C. to 55° C., so as to convert the kainite into leonite ($K_2SO_4.MgSO_4.4H_2O$), thereby obtaining a composition comprising leonite, wherein leonite is present in the composition comprising leonite at a concentration of at least 90% by weight;
   IVa) optionally, contacting the leonite, obtained in step Ma, with water to remove excess $MgSO_4$; and
   Va) contacting the leonite obtained in step Ma or IVa, with water so as to leach the $MgSO_4$ contained in the leonite and to at least substantially selectively crystallize potassium sulphate ($K_2SO_4$).

2. The method of claim 1, wherein the aqueous potassium- and sulphate-containing composition is a solution mining brine.

3. The method of claim 2, further comprising contacting one or more potash-containing ores with water so as to obtain the aqueous potassium- and sulphate-containing composition.

4. The method according to claim 1, wherein the aqueous potassium and sulphate-containing composition comprises about 5 to about 200 g/l of K ion.

5. The method according to claim 1, wherein the aqueous potassium and sulphate-containing composition comprises about 5 to about 100 g/l of $SO_4^{2-}$ ion.

6. The method according to claim 1, wherein the aqueous potassium and sulphate-containing composition comprises about 5 to about 150 g/l of $Mg^{2+}$ ion.

7. The method according to claim 1, wherein contacting the aqueous potassium- and sulphate-containing composition with magnesium chloride is carried out by contacting the aqueous potassium- and sulphate-containing composition with an aqueous composition comprising the magnesium chloride.

8. The method of claim 7, wherein the composition comprising the magnesium chloride comprises about 5 to about 300 g/l of $Mg^{2+}$ ion.

9. The method according to claim 1, wherein the method comprises controlling the concentration of sodium chloride present in the composition comprising kainite so as to maintain the concentration of sodium chloride below about 10% by weight on dry matter basis.

10. The method according to claim 1, wherein the concentration of sodium chloride in the kainite composition is controlled by flotation.

11. The method according to claim 1, wherein the controlling of the concentration of sodium chloride, present in the composition comprising kainite, is effective for obtaining a concentration of kainite of above 50% by weight on dry matter basis.

12. The method according to claim 1, wherein the method avoids formation of bloedite.

13. The method according to claim 1, wherein the leonite obtained in step Ma comprises less than 5% by weight of bloedite.

14. The method according to claim 1, wherein the method avoids formation of schoenite.

15. The method according to claim 1, wherein the leonite obtained in step Ma comprises less than 5% by weight of schoenite.

16. The method according to claim 1, wherein the crystallized potassium sulphate obtained contains less than 10% by weight of impurities.

17. The method of claim 1, wherein step Va provides crystallized potassium sulfate, and the method further comprises separating the crystallized potassium sulfate from a water leach by means of a solid-liquid separation, wherein the water leach comprises potassium sulphate and magnesium sulphate.

18. The method according to claim 17, further comprising recycling the water leach by reacting kainite with the water leach to convert the kainite into leonite.

19. The method according to claim 1, wherein the crystallization of the potassium sulphate is carried out at a temperature of 45° C. to 60° C.

* * * * *